Aug. 15, 1961 J. C. COPES 2,996,319
SPLIT MECHANICAL SEAL
Filed Dec. 31, 1957

JOHN C. COPES
INVENTOR

BY Wm. E. Ford
ATTORNEY

United States Patent Office 2,996,319
Patented Aug. 15, 1961

2,996,319
SPLIT MECHANICAL SEAL
John C. Copes, 1435 New York St., New Orleans, La.
Filed Dec. 31, 1957, Ser. No. 706,511
9 Claims. (Cl. 286—11.15)

This invention relates to a split mechanical seal constructed to permit easy removal and replacement of the elements relatively rotatable with relation to each other, thereby effecting savings in labor and maintenance costs in cases where the unavoidable wear between such elements requires frequent replacement.

In machines employed in plants and in various other usages as operative equipment, and most commonly in centrifugal pumps, it is necessary to provide a seal between a rotary member, such as a shaft, and a stationary member, such as a housing, or conversely, between a rotary housing, and the like, and a stationary shaft, stud, pipe, or similar round member. Such seals, although made of wear resistant material, and often specially treated to increase resistance to abrasion, wear, or corrosion, nevertheless in service will wear away or become corroded so that it is necessary at relatively frequent intervals to replace the parts which are in surface to surface contact upon relative rotation therebetween.

Frequently, and as a general proposition, such parts of annular shape, integrally formed and not interrupted or split, will require removal of surrounding and adjacent machine parts at a great expenditure of time and labor, and with consequent excess monetary loss, before ample access room can be had to permit replacement. For instance, in a case where a shaft may extend from a housing, the exterior bearing or journal member for such shaft or otherwise parts connected to the shaft, as a clutch, externally of the housing, will have to be removed before such wear elements can be brought into access position for removal. During this period the machine driven by the shaft is "down" or inoperative, and its production is lost during the interval of repair. Also, it takes considerable time to remove sufficient parts to obtain access space for replacement of the wear elements.

The solution to this problem has resided in providing opposed ring inserts in adjacent rotary and stationary parts of a seal assembly, so that the elements containing the inserts do not have to be split, with the resultant chance of leakage between the adjacent split segments, but rather the ring inserts are split, while being adapted to maintain firm contact between adjacent segments of the ring inserts. Considering the foregoing, the objects of this invention will be apparent, including the objects hereinbelow set forth.

It is a primary object of this invention to provide a mechanical seal of this class in which the adjacent elements of the rotary and stationary parts of the seal have split ring inserts therein to bear in face to face, sealing contact during relative rotation therebetween, thereby permitting ease of access for replacement of the inserts in case of wear therebetween.

It is another important object of this invention to provide a seal of this class in which the adjacent elements of the rotary and stationary parts of the seal have split ring inserts therein to bear in face to face, sealing contact during relative rotation therebetween while the adjacent elements containing such inserts are integrally formed, uninterrupted elements not themselves subject to wear by rotational contact therebetween, nor to the hazards of excess centrifugal force acting directly thereupon, nor to dangers from leakages between adjacent split segments as otherwise might occur were such elements themselves split.

It is also another and paramount object of this invention to provide a mechanical seal of this class in which the wear parts are easily removed and replaced within minimum time limits, thereby effecting savings in time, labor, and shut-down.

It is another and further object of this invention to provide a seal of this class adapted to be constructed to carry out the foregoing objects with a minimum cost in labor and materials, and with a minimum of working parts.

Other and further objects will be apparent when the specification herein is considered in connection with the drawings in which.

Figure 1:
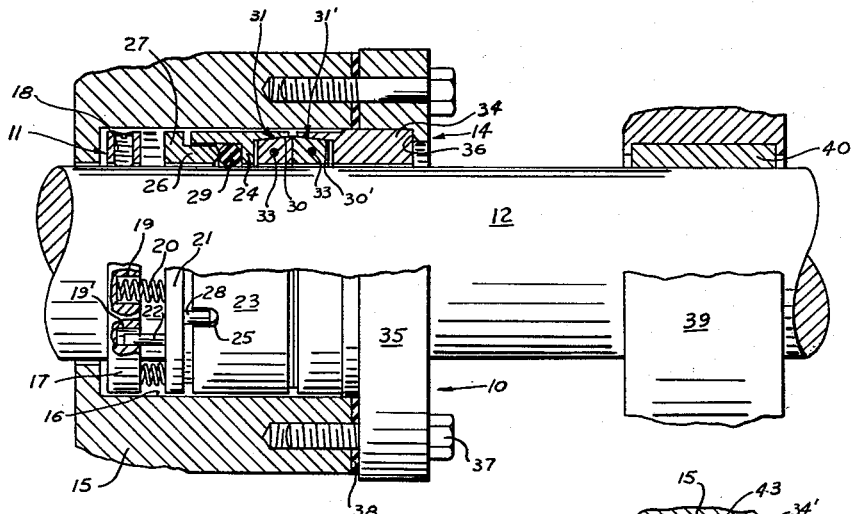
FIG. 1 is a sectional view showing a preferred embodiment of the invention.

Referring in detail to the drawings in which corresponding reference numerals are assigned to corresponding elements in the various views, a mechanical seal 10 is shown in FIG. 1 comprising an assembly 11 connected to rotate with a shaft 12, and an assembly 14 connected to a stationary part or assembly, as a housing 15, such as a pump housing. The housing 15 has a counterbore 16 therein into which the shaft connected assembly 11 and part of the stationary assembly 14 is shown extending.

The innermost element of the assembly 11 is a collar 17 which is connected to the shaft 12 by means of set-screws 18 threaded through tapped radial holes in the collar. The outer face of the collar 17 has angularly spaced apart recesses 19 therein to receive the inner ends of springs 20 therein, and such face also provides therein angularly spaced apart recesses 19'. Outwardly of the collar 17 a compression ring 21, as will be hereinbelow described, surrounds the shaft 12.

The springs 20, which bear at one end in the collar recesses 19, bear at their other ends against the inner face of the compression ring 21, and this inner face has pins 22 extending therefrom into the collar recesses 19' so that when the collar 17 rotates with the shaft 12, a driving connection is effected between the collar and the compression ring. Adjacent the compression ring 21 and surrounding the shaft 12 there is provided a seal ring 23 which has an internally extending flange 24 centrally therein, such seal ring providing recesses 25 in the inner face thereof. The compression ring 21 has a turned down or reduced diameter part 26 as the outer part thereof, leaving a larger diameter or flange portion 27 as the inner part thereof from which the pins 22, hereinabove described, extend inwardly, and from which pins 28 extend outwardly into the recesses 25 in the seal ring 23 to establish a driving connection between the compression ring 21 and the seal ring 23. The seal ring 23 receives therein the part 26 extending from the compression ring 21 to bear against a packing element as an O-ring 29 to force it as a static seal against the inner face of the internally extending flange 24, as the springs 20 urge the compression ring outwardly. In this manner a seal is effected against fluid passage between the shaft and the O-ring and between the seal ring and the O-ring.

On the opposite side of the flange 24 from the O-ring 29, the inner surface of the seal ring 23 is tapered outwardly at 30 as shown, and a split ring insert 31, comprising the half-ring parts 32, 32' and correspondingly tapered to fit within the taper 30 is insertable into the taper but short of contact with the outer face of the internally extending flange 24. Dowels 33 and corresponding recesses are provided in the respective insert ring parts or segments 32, 32' to insure aligned interfitment and identification of such segments.

Outwardly of the split ring insert 31' an insert adapter 34 surrounds the shaft 12 and has a tapered bore 30' therein to receive a correspondingly tapered split ring insert 31' extending into the bore 30' but slightly short of the base of the bore, the segments of the ring having intermating dowels and recesses, not shown, but corresponding to the dowels and recesses of the respective segments 32, 32'. The adapter 34 is press-fitted into a connection flange 35 to shoulder at 36 therein, such flange surrounding the shaft 12, and being connected to the housing 15 by means of stud bolts 37, a suitable gasket 38 being provided to effect sealing between the housing and the flange 35. The inner end of the adapter 34 is of diameter to slidably and guidably fit within the bore 16, as shown in FIG. 1.

Usually, such a seal 10 is installed adjacent to some element or mechanism which drives the shaft 12, which is driven by the shaft, or in which the shaft is journalled. As shown in FIG. 1 a journal member 39 having bushing means 40 therein through which the shaft 12 extends, is positioned to support the shaft 12 in such proximity thereto that the journal 39 will have to be moved outwardly along the shaft 12, or altogether removed, to provide room to remove the wear elements between the rotary assembly 11 and stationary assembly 14, in cases where such elements are not split for easy removal.

However, with the instant structure, it will not be necessary to remove the journal 39, as it is only necessary to disconnect the connection assembly 14, comprising the flange 35 and its insert adapter 34, in order to remove the split ring insert 31' and gain access to remove the split ring insert 31 in the seal ring 23. Thereafter, there can still be room enough gained after the assembly 14 is slid outwardly toward the journal member 39, to draw the seal ring 23 outwardly to gain access to the compression ring 21 and the collar 17 inwardly thereof.

Figure 2:
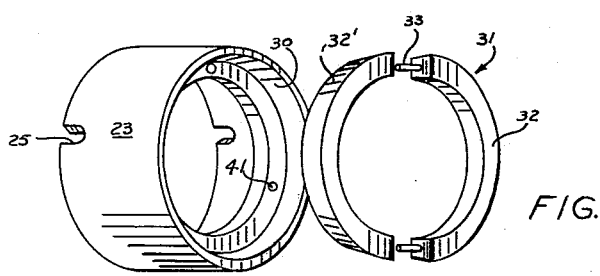
FIG. 2 is a perspective view of the seal ring and the split ring insert therefor, as shown in section in FIG. 1.

After access has been gained to the split ring inserts 31 and 31' it may nevertheless be difficult to remove them from the seal ring 23 and adapter insert 34, respectively. To facilitate such removal access holes for knockout punches are provided, such holes 41 are shown in FIG. 2 in the internally extending flange 24, and corresponding holes, not shown, would extend through the adapter insert 34 to give access to punch out the split ring insert 31'.

As a matter of construction the inserts 31, 31' may be of any two suitable, wear resistant, diverse materials, for instance one may be of a high grade carbon while the other may be of Stellite. As another example, one may be of cast iron and the other of ceramic.

The invention is not limited to the specific arrangement shown, for instance the housing 15 and the assembly 14 carried thereby may be the rotary part, and what is shown as the shaft 12 and the assembly 11 mounted thereon may be the stationary part. Also the housing 15 could extend to the right of the flange 35, rather than to the left thereof, as shown in FIG. 1. And other arrangements are possible in which the basic principles of the split ring inserts may be employed.

Figure 3:
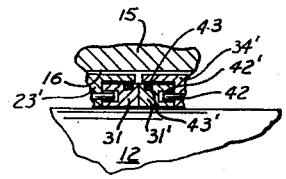
FIG. 3 is a sectional fragmentary view showing another form of split ring insert, seal ring, and insert adapter, differing in degree from the construction of these elements shown in FIG. 1.

As shown in Fig. 3 variations in the split ring inserts themselves may fall within the scope of the invention. In this modification the seal ring 23' and the insert adapter 34' are not tapered, while the respective split ring inserts 31 and 31' are not spaced from the internally extending flange 24 and from the inner face of the insert adapter 34, but rather driving connection is effected between these elements, as by drive pins 42 extending from the flange 24 and from the adapter insert 34, into, but not to the ends of holes 42' in the split ring inserts.

The inserts 31 and 31' have peripheral grooves 43' therein to receive O-rings 43 to effectively seal against fluid passage between these inserts and the seal ring 23' and adapter insert 34' respectively. Then, since the springs 20 are of strength to effectively urge the insert 31, as it rotates, to maintain effective face to face sealing with the stationary insert 31', no leakage can occur along these sealing surfaces.

Figures 4, 5:
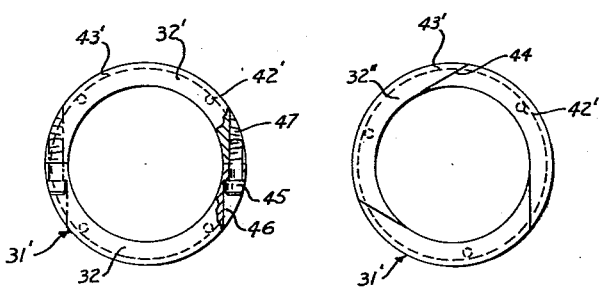
FIG. 4 is a transverse view of one modification of split insert ring construction corresponding with the sectional fragmentary view shown in FIG. 3.
FIG. 5 is a transverse view of another modification of split insert ring construction, such view also corresponding with the sectional fragmentary view shown in FIG. 3.

FIGS. 4 and 5 may be considered views looking at the face of the right hand split ring insert 31' shown in FIG. 3, each view showing a variation of construction to insure that the adjacent ring segments are held together and maintain sealing contact therebetween in service. As shown in FIG. 4, the ring segment 32 is bored and counterbored on opposite sides thereof to receive cap-screws 45 with heads to shoulder at the bases of the counterbores 46, while the ring segment 32' has tapped holes 47 on opposite sides thereof to receive the threaded shanks of the cap-screws 45. As shown in FIG. 5, the ring segments 32" are divided from each other by tangentially extending splits 44, so that in case the segments tend to slide one upon the other responsive to centrifugal force, sealing effect is still maintained between the adjacent segment surfaces.

The invention is not limited to the structures and embodiments hereinabove described, but other variations, modifications, and combinations are considered as well, as such may fall within the broad spirit of the invention, and within the broad scope of interpretation claimed and merited by the appended claims.

What is claimed is:

1. A mechanical seal adapted to seal between stationary and rotary parts wherein said parts may comprise a shaft and a structure as a housing either being rotatable with the other being stationary, said seal comprising a first assembly connected to said shaft and a second assembly connecting said seal to said structure and establishing relative rotary surface contact with said first assembly, said first assembly comprising a collar connected to said shaft, a compression ring surrounding said shaft, means establishing a driving connection between said collar and said compression ring, yieldable means urging said compression ring away from said collar, a seal ring around said shaft having an internal transversely extending flange therein and a packing means on the compression ring side of said internal flange against which said compression ring is urged by said yieldable means, means establishing a driving connection between said compression ring and said seal ring, the wall of said seal ring on the end portion thereof opposite said packing means being internally tapered from a smaller diameter inwardly to a larger diameter at the end of said seal ring, a first tapered split ring insert of inner diameter to receive said shaft with clearance therethrough and adapted to be tightly pressed within the taper of said seal ring to establish rigid driving contact with and to prohibit relative rotation between said first tapered split ring insert and said seal ring and thereby to rotate with said seal ring, a second assembly comprising means connected to said structure receiving said shaft therethrough with the wall of said structure connected means being internally tapered from a smaller diameter inwardly to a larger diameter adjacent said seal ring, and a second tapered split ring insert of inner diameter to receive said shaft with clearance therethrough and adapted to be tightly pressed within the taper of said connected means to establish rigid driving contact with and to prohibit relative rotation between said second tapered split ring insert and said structure connected means and to bear in face to face contact with said first tapered split ring insert, said tapered split ring inserts being adapted to maintain firm contact between the adjacent segments of each ring in assembly and upon relative rotation between said tapered split ring inserts, said structure connected means and said seal ring being constructed to be spaced apart by said inserts to admit pressure fluid to act against said inserts to urge them more tightly against said internally tapered walls as pressure fluid and said yieldable means urge in direction to maintain said inserts in face to face contact, said packing means sealing against leakage between said compression ring and said shaft and between said seal ring and said shaft, and the contact between said tapered split ring insert faces sealing against leakage between said faces, said tapered split ring inserts being removable for replacement by the disconnecting of said structure connected means and sliding said connected means and said seal ring slightly upon said shaft to give removal access to said tapered split ring inserts.

2. A mechanical seal adapted to seal between stationary and rotary parts wherein said parts may comprise a shaft and a structure as a housing either being rotatable with the other being stationary, said seal comprising a first assembly connected to said shaft and a second assembly connecting said seal to said structure and establishing relative rotary surface contact with said first assembly, said first assembly comprising a backing member rotatable with said shaft, a seal ring around said shaft having an internally extending flange spaced between the ends thereof, means on the backing member side of said flange and adapted to effect a seal against fluid passage between said seal ring and said shaft, an intervening means between said backing member and said seal ring establishing a driving connection therebetween and yieldably urging said seal ring away from said backing member, the wall of said seal ring on the end portion thereof opposite said intervening means being internally tapered from a smaller diameter inwardly to a larger diameter at the end of said seal ring, a first tapered split ring insert of inner diameter to receive said shaft with clearance therethrough and adapted to be tightly pressed within the taper of said seal ring to establish rigid driving contact with and to prohibit relative rotation between said first tapered split ring insert and said seal ring and thereby to rotate with said seal ring and seal against fluid passage therebetween, a second assembly comprising means connected to said structure receiving said shaft therethrough with the wall of said structure connected means being internally tapered from a smaller diameter inwardly to a larger diameter adjacent said seal ring, and a second tapered split ring insert of inner diameter to receive said shaft with clearance therethrough and adapted to be tightly pressed within said structure connected means to establish rigid driving contact with and to prohibit relative rotation between said second tapered split ring insert and said structure connected means and to bear in face to face contact with said first tapered split ring insert and sealing against fluid passage between said second tapered split ring insert and said structure connected means, said tapered split ring inserts being adapted to maintain firm contact between the adjacent segments thereof, said tapered split ring inserts being removable for removable for replacement by disconnecting said structure connected means and sliding said connected to means to give access for tapered split ring insert removal.

3. A mechanical seal adapted to seal between stationary and rotary parts wherein said parts may comprise a shaft and a structure as a housing with said shaft and said strucrture being relatively rotatable, said seal comprising a backing member rotatable with said shaft, a rigid seal ring around said shaft having an internally extending flange spaced between the ends thereof, means on the backing member side of said flange and adapted to effect a seal against fluid passage between said seal ring and said shaft, an intervening means between said backing member and said seal ring establishing a driving connection therebetween and yieldably urging said seal ring away from said backing member, a rigid structure connected means of inner diameter to receive said shaft with clearance therethrough, a tapered recess in each of said seal ring and said structure connected means, a pair of tapered rigid split ring inserts one to fit and base in each recess to establish rigid driving contact with the recess providing member in which it is fitted and based, each insert being of inner diameter to receive said shaft therethrough with clearance, an O-ring seal between each split ring insert and the recess into which it is inserted, and pin and pin hole means provided cooperatively by each split insert and the recess providing element into which it is inserted to prohibit relative rotation between each split ring insert and its recess providing element, said seal ring and said structure connected means being spaced by said inserts as said inserts bear sealably in face to face contact with each other, the segments into which said split ring insert is divided by being split being adapted to maintain firm contact between adjacent segments and said split ring insert being removable for replacement by disconnecting said structure connected means from said structure and sliding said structure connected means along said shaft to provide access for such removal.

4. A mechanical seal as claimed in claim 3 in which said segments are cap-screw connected.

5. A mechanical seal as claimed in claim 3 in which said segments may slide relatively along tangentially split surfaces thereof while maintaining sealing contact between segments as said segments may be moved by centrifugal force in directions to contract or permit expansion of said O-ring.

6. A mechanical seal adapted to seal between stationary and rotary parts wherein said parts may comprise a shaft and a structure as a housing with said shaft and said structure being relatively rotatable, said seal comprising a backing member rotatable with said shaft, a rigid seal ring around said shaft having an internally extending flange spaced between the ends thereof, means on the backing member side of said flange and adapted to effect a seal against fluid passage between said seal ring and said shaft, an intervening means between said backing member and said seal ring establishing a driving connection therebetween and yieldably urging said seal ring away from said backing member, a rigid structure connected means of inner diameter to receive said shaft with clearance therethrough, a rigid, split ring insert of inner diameter to receive said shaft therethrough with clearance, at least one of said seal ring and said structure connected means together with said split insert being cooperatively adapted to permit said split ring insert to be frictionally received within the other cooperatively adapted element to establish rigid driving contact therebetween and to prohibit relative rotation therebetween, a rigid seal member carried by the other of said seal ring and said structure connected means and adapted to bear in face to face contact with said split ring insert and to seal against fluid passage between said seal member and the one of said seal ring and said structure connected means which carries it to establish rigid driving contact and to prohibit relative rotation therebetween, that one of said split ring insert and said seal member which is carried in said seal ring sealing against fluid passage therebetween, the segments into which said split ring insert is divided by being split being adapted to maintain firm contact between adjacent segments and said split ring insert being removable for replacement by disconnecting said structure connected means from said structure and sliding said structure connected means outwardly along said shaft to provide access for such removal.

7. A mechanical seal adapted to seal between stationary and rotary parts wherein said parts may comprise a shaft and a structure as a housing with said shaft and said structure being relatively rotatable, said seal comprising a backing member rotatable with said shaft, a rigid seal ring around said shaft having an internally extending flange spaced between the ends thereof, means on the backing member side of said flange and adapted to effect a seal against fluid passage between said seal ring and said shaft, an intervening means between said backing member and said seal ring establishing a driving connection therebetween and yieldably urging said seal ring away from said backing member, a rigid structure connected means of inner diameter to receive said shaft with clearance therethrough, said seal including a rigid, split ring insert and a rigid seal member, both of inner diameter to receive said shaft with clearance therethrough, one of said seal ring and said structure connected means being of inner diametral form and said split ring insert being externally formed to be frictionally fitted into such inner diametral form in manner that rigid driving contact is transmitted to said insert and that relative rotation is prohibited between said insert and said one of said seal ring and said structure connected means, the other of said seal ring and said structure connected means being of inner diametral form and said rigid seal member being externally formed to be frictionally fitted into the inner diametral form of the other of said seal ring and said structure means connected in manner that rigid driving connection is transmitted to said rigid seal member and that relative rotation is prohibited between said rigid seal member and said other of said seal ring and said structure connected means, the urging of said intervening means against said seal ring resulting in said split ring insert and said rigid seal member being maintained in face to face, relatively rotatable, sealing contact as said shaft is rotated within said structure, that one of said split ring insert and said seal member which is carried in said seal ring sealing against fluid passage therebetween, the segments into which said split ring insert is divided by being split being adapted to maintain firm contact between adjacent segments and said split ring insert being removable for replacement by disconnecting said structure connected means from said structure and sliding said structure connected means outwardly along said shaft to provide access for such removal.

8. A mechanical seal as claimed in claim 7 in which pin and pin hole means are provided cooperatively by said split ring insert and that one of said seal ring and said structure connected means into which said split ring insert is frictionally fitted whereby to insure said rigid driving contact and the prohibition of said relative rotation between said insert and said one of said seal ring and said structure connected means which receives said split ring insert.

9. A mechanical seal adapted to seal between stationary and rotary parts wherein said parts may comprise a shaft and a structure as a housing with said shaft and said structure being relatively rotatable, said seal including a rigid seal ring having an internally extending flange spaced between the ends thereof and a structure connected means, said seal including a rigid, split ring insert and a rigid seal member, both of inner diameter to receive said shaft with clearance therethrough, one of said seal ring and said structure connected means being of inner diametral form and said split ring insert being externally formed to be frictionally fitted into such inner diametral form in manner that rigid driving contact is transmitted to said insert and that relative roation is prohibited between said insert and said one of said ring and said structure connected means, the other of said seal ring and said structure connected means being of inner diametral form and said rigid seal member being externally formed to be frictionally fitted into the inner diametral form of the other of said seal ring and said structure connected means in manner that rigid driving connection is transmitted to said rigid seal member and that relative rotation is prohibited between said rigid seal members and said other of said seal ring and said structure means, said seal ring including seal means therein on the opposed side of said flange from said split ring insert and said seal member adapted to effect a seal against fluid passage between said seal ring and said shaft, both said flange and said structure connected means being of inner diameters to receive said shaft with clearance therethrough, said seal housing having operable therein a force applying means to act against said seal means and said seal ring whereby to maintain said seal member and said split ring insert in face to face, relatively, rotatable sealing contact as said shaft is rotated within said structure, that one of said split ring insert and said seal member which is carried in said seal ring sealing against fluid passage therebetween, the segments into which said split ring insert is divided by being split being adapted to maintain firm contact between adjacent segments and said split ring insert being removable for replacement by disconnecting said structure connected means from said structure and sliding said structure connected outwardly along said shaft to provide access for such removal.

References Cited in the file of this patent

UNITED STATES PATENTS

| | | |
|---|---|---|
| 729,904 | Somes | June 2, 1903 |
| 1,050,870 | Stickley | Jan. 21, 1913 |
| 1,681,770 | Kautzky | Aug. 21, 1928 |
| 2,770,477 | Rankin | Nov. 13, 1956 |
| 2,921,806 | Carter | Jan. 14, 1960 |

OTHER REFERENCES

"Mechanical Seals for Handling Abrasive Liquids" (Norton), Chemical Engineering, September 1956. (Pages 199–210 relied on.)